United States Patent [19]

McCall

[11] 4,020,349
[45] Apr. 26, 1977

[54] APPARATUS FOR READING AND RECHARGING CONDENSER IONIZATION CHAMBERS

[76] Inventor: Richard C. McCall, 170 Hobart Heights, Woodside, Calif. 94062

[22] Filed: Oct. 28, 1975

[21] Appl. No.: 626,188

[52] U.S. Cl. .............................. 250/377; 250/388
[51] Int. Cl.² .......................................... G01T 1/18
[58] Field of Search ................... 250/376, 377, 388

[56] References Cited
UNITED STATES PATENTS

| 2,871,365 | 1/1959 | Cahen et al. | 250/377 |
| 2,884,533 | 4/1959 | Richard-Foy | 250/377 |

Primary Examiner—Archie R. Borchelt
Attorney, Agent, or Firm—Patrick J. Barrett

[57] ABSTRACT

A metering circuit for a condenser ionization chamber is disclosed for simultaneously recharging the ionization chamber and reading out the amount of charge required to recharge the chamber. During the recharging process, the amount of charge necessary to recharge the ionization chamber capacitor is placed on an integrating capacitor in the metering apparatus. The resultant voltage across the integrating capacitor is a measure of the radiation to which the ionization chamber was exposed.

9 Claims, 1 Drawing Figure

U.S. Patent   April 26, 1977   4,020,349
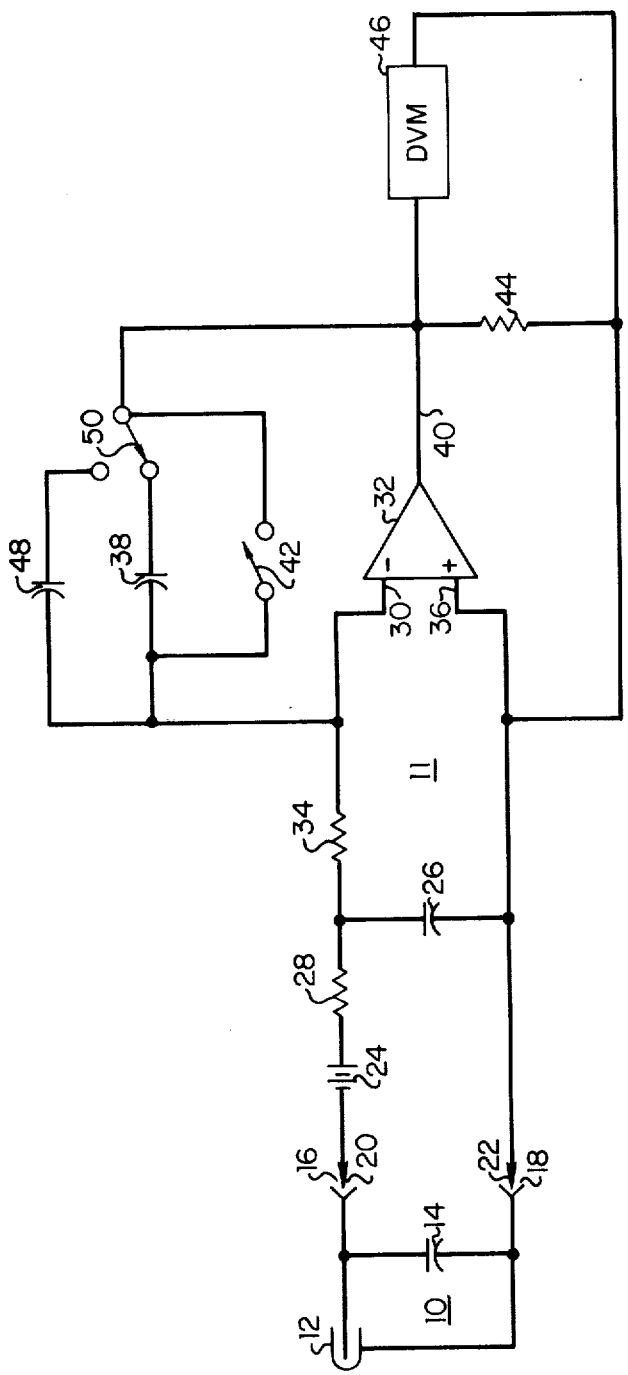

APPARATUS FOR READING AND RECHARGING CONDENSER IONIZATION CHAMBERS

BACKGROUND OF THE INVENTION

1. Field of the Invention

The field to which this invention most nearly relates is measurement and recharging apparatus for condenser ionization chambers.

2. Description of the Prior Art

A condenser ionization chamber comprises an ionization chamber with a capacitor connected in parallel with the electrodes of the chamber. The structure and operation of such chambers are described in detail in many references such as *Fundamental Physics of Radiology* by Meredith and Massey (1972). Before the chamber is used, a charge is placed on the capacitor. When radiation passes through the ionization chamber, the gas in the chamber is ionized, and the ions are attracted to the electrodes of the chamber by the voltage impressed on them by the parallel connected capacitor. These ions discharge the capacitor, and the amount the capacitor is discharged is a direct measure of the radiation exposure. The concomitant voltage drop on the capacitor is then an indication of the radiation dose received by the chamber.

Prior art measurement apparatus usually measure the voltage on the capacitor before and after exposure to radiation, determine the voltage difference, and then convert the voltage difference into the equivalent charge, based on the value of the capacitor in the chamber. Several different means for making such measurements are known and are described in the above cited reference and in U.S. Pat. No. 3,010,021 to Roesch et al.

There are a number of disadvantages to the prior art measurement systems since they usually require measuring the difference between two relatively large voltages along with the conversion of this voltage to the desired quantity, charge. The conversion process is also subject to errors in the measurement of the value of the capacitor in the ionization chamber. In addition, most prior art devices require separate measuring and recharging operations. Even those devices which do measure and recharge in the same operation do not measure directly the desired quantity, charge.

When a large radiation dose is measured, the capacitor across the ionization chamber is discharged by a large amount, changing the field strength in the chamber significantly. This can cause errors due to recombination loss of ions in the chamber. In addition, the large voltage difference between the terminals on the condenser ionization chamber and the measurement device terminals can cause sparking, introducing measurement errors.

These last two problems can be solved by using a different kind of ionization chamber —the cable-connected ionization chamber. This type of chamber, shown for example in U.S. Pat. No. 3,614,444 is always connected to the metering circuitry by a cable and always kept fully charged via the cable. This being the case, no capacitor is required in parallel with the ionization chamber. This type of ionization chamber, however, has the significant disadvantage that it is not highly portable since movement of the chamber is limited by the cable.

Condenser ionization chambers are usually quite small since they are often used for personnel radiation monitoring, and a cable-connected ionization chamber is totally unsuitable for such use.

SUMMARY OF THE INVENTION

According to the preferred embodiment of the present invention, a readout apparatus for a condenser ionization chamber is provided having circuitry for simultaneously recharging and reading out the ionization chamber. An integrator comprising an operational amplifier, with a capacitor in a negative feedback path around the amplifier, has a recharging voltage source in its input circuit. A resistor-capacitor network is connected between the voltage source and the integrator to govern the recharging rate. When a condenser ionization chamber is connected to the voltage source and an input amplifier, the charge that flows onto the capacitor in the ionization chamber also appears on the integrating capacitor. The voltage at the output of the integrator, which is directly proportional to the charge on the integrating capacitor, can then be measured to determine the radiation dose received by the ionization chamber.

DESCRIPTION OF THE DRAWING

The FIGURE shows a schematic diagram of the preferred embodiment of the present invention.

DESCRIPTION OF THE PREFERRED EMBODIMENT

As shown in the FIGURE, a condenser ionization chamber 10 includes an ionization chamber 12 connected to a capacitor 14 and to a connector having terminals 16 and 18. In use, as described above, the capacitor is charged to a predetermined voltage, $V_1$, and any radiation passing through ionization chamber 12 ionizes the gas within the chamber partially discharging the capacitor. After the ionization chamber has been exposed to radiation for the desired amount of time, it is connected to a metering and recharging circuit via connector terminals 16 and 18.

The metering circuit 11 of the preferred embodiment of the present invention is provided with a connector having two terminals 20 and 22 for mating with connector terminals 16 and 18. Connector terminal 20 is connected to one terminal of a voltage source 24 which supplies the recharging potential, $V_1$. One terminal of a capacitor 26 is connected to the other terminal of voltage source 24 by a resistor 28 and to an inverting input 20 of an operational amplifier 32 by a resistor 34. The other terminal of capacitor 26 is connected to a noninverting input 36 of amplifier 32 and to connector terminal 22.

A capacitor 38 is connected in a feedback path between an output 40 of amplifier 32 and input 30, and a switch 42 is connected across capacitor 38 to permit discharging of the capacitor in order to reset the meter to zero. A resistor 44 is connected between output 40 and input 36, with a voltmeter 46, preferably a digital voltmeter (DVM), connected across the resistor.

When a partially discharged ionization chamber is connected to connector terminals 20 and 22, voltage source 24 will recharge capacitor 14 and, in the process, the amount of charge delivered to capacitor 14 will flow out of input 30. Resistor 28 and capacitor 26 keep the rate of charge transfer within the slew rate capabilities of amplifier 32. Since there is capacitive feedback around the amplifier, it will act as an integrator and the amount of charge that flows out of input 30 will be transferred to capacitor 38 as the amplifier attempts to keep input 30 at the same level as input 36. Resistor 34 is provided so that the feedback around the amplifier will not reduce the effective capacitance of capacitor 26.

Once the ionization chamber capacitor 14 is recharged, the charge that was removed from it, due to ionization caused by radiation passing through ionization chamber 12, will be on capacitor 38. A voltage proportional to this charge will appear across resistor 44 and can be read on meter 46. The value of resistor 44 and the scale of meter 46 can be selected so that the meter will read directly in units of radiaion, such as Roentgens.

In order to reduce the loss of charge due to leakage, it is desirable that the capacitors in the metering circuit have a high leakage resistance of the order of $10^{12}$ ohms or greater, such as is the case with capacitors having polystyrene or polytetrafluoroethylene dielectrics. Switch 42 should have a similarly high leakage resistance. The amplifier should have a high input impedance, preferably greater than $10^{12}$ ohms, and a low input capacitance, preferably less than $10^{-10}$ Farads. It is also desirable to have an amplifier gain greater than $10^5$, a current offset less than $10^{-13}$ amps, and a voltage offset less than $10^{-4}$ volts. A typical amplifier having suitable specifications is the Analog Devices model 310. Voltage source 24 must be insulated from ground, preferably by $10^{12}$ ohms or more, and should be guarded and shielded. Likewise, the input connector should have a similarly high leakage resistance and should be guarded.

Typical values for the metering circuit components are as follows:

Capacitor 38 = 0.003 microfarads
Capacitor 26 = 0.001 microfarads
Resistor 28 = 1 gigaohm
Resistor 34 = 1 gigaohm
Resistor 44 = 10 kilohms The output voltage, $V_1$, chosen for voltage source 24 will depend, among other things, on the specifications of the condenser ionization chamber being used. A typical value used in the preferred embodiment is 500 volts.

As discussed more fully in the references mentioned above, a condenser ionization chamber is charged to as high a voltage as possible, limited by the capabilities of the insulators, to provide for the maximum measurement range. Prior art readout devices, such as the well known Victoreen R-Meter and its associated condenser ionization chambers, usually require a relatively large voltage change on the ionization chamber capacitor to measure a given dose of radiation. Thus, for example, there is a 250-volt difference, from 400 to 150 volts, with the Victoreen 100R chamber, for a measurement of a 100-Roentgen dose.

By comparison, the same dose may be measured with only a 12.5-volt change, from 500 to 487.5 volts, using the preferred embodiment of this invention. Thus, for the same voltage range of 250 volts, the preferred embodiment can measure a dose of 2000 Roentgen. These advantages are achieved in part by using a larger capacitor 14 of 1000 picofarads, versus the 50-picofarad capacitor used in the Victoreen 100R chamber. It should be understood, however, that these values are by way of example only and that other capacitor values can be used with the present invention.

Equally accurate or better measurements can be made with the preferred embodiment because it measures directly the charge placed on capacitor 14 during the recharging process by transferring an equal amount of charge to capacitor 38. Thus it is not necessary to measure accurately the difference between two large voltages, with all the attendant errors in measuring the difference between two large numbers, as is required in prior art instruments.

The reduction in voltage change on capacitor 14 for a given radiation dose achieved by the preferred embodiment of the present invention has other practical advantages. Because the voltage across the chamber stays relatively constant throughout a measurement, the ion collection stays relatively constant and there is less chance of losing an ion due to recombination before it reaches one of the electrodes. A smaller voltage difference between capacitor 14 and voltage source 24 also means that errors are less likely to be introduced due to sparking or air gap conduction when connector terminals 16 and 18 are mated with connector terminals 20 and 22.

It will be understood by those skilled in the art that certain variations can be made in the preferred embodiment without departing from the spirit and scope of the invention. For example, the measurement range of the metering circuitry can be changed by providing a different value of capacitor 38 to produce a different output voltage for a given amount of charge. A change in the capacitor may be conveniently achieved by providing a second capacitor 48 and a switch 50 for selecting the appropriate capacitor as shown in the FIGURE.

What I claim is:

1. An apparatus for recharging a condenser ionization chamber and simultaneously measuring the amount of charge required to recharge it, comprising:
    input means for connection to a condenser ionization chamber;
    a source of potential coupled to the input means;
    an integrator circuit having an input connected to the source of potential and having an output; and
    measuring means coupled to the output of the integrator circuit for measuring the amount of charge stored in the integrator circuit.

2. An apparatus as in claim 1 wherein the integrator circuit comprises an amplifier having an input and an output and a capacitive feedback circuit connected between the amplifier input and output.

3. An apparatus as in claim 2 wherein the amplifier is a differential amplifier having an inverting and a noninverting input, the noninverting amplifier input being coupled to the input means, the inverting amplifier input being coupled to the capacitive feedback circuit, and the source of potential being coupled between the input means and the inverting amplifier input.

4. An apparatus as in claim 3, wherein the input means comprises:
    first and second connector terminals for making connection with the condenser ionization chamber, the first connector terminal being coupled to the source of potential and the second connector terminal being coupled to the noninverting amplifier input; and
    a network coupled to the amplifier inputs for controlling the charging rate of the apparatus.

5. An apparatus as in claim 4 wherein the network comprises:
    a first resistor connected to the source of potential;

a second resistor connected between the first resistor and the inverting amplifier input; and a capacitor connected between the junction of the first and second resistors and the noninverting amplifier input.

6. An apparatus as in claim 5 wherein the measuring means comprises a third resistor connected between the amplifier output and the noninverting amplifier input and a voltmeter connected across the third resistor.

7. An apparatus as in claim 6 wherein the capacitive feedback circuit includes a feedback capacitor and a reset switch connected across the feedback capacitor for selectively shorting the capacitor.

8. An apparatus as in claim 7 wherein the voltmeter is a digital voltmeter.

9. An apparatus as in claim 7 wherein the capacitive feedback means further includes an additional feedback capacitor and a range switch connected to the feedback capacitor and the additional feedback capacitor for connecting one of these capacitors between the amplifier output and the inverting amplifier input.

* * * * *